(No Model.)
N. E. SPRINGSTEEN.
CAR COUPLING.
No. 363,262. Patented May 17, 1887.
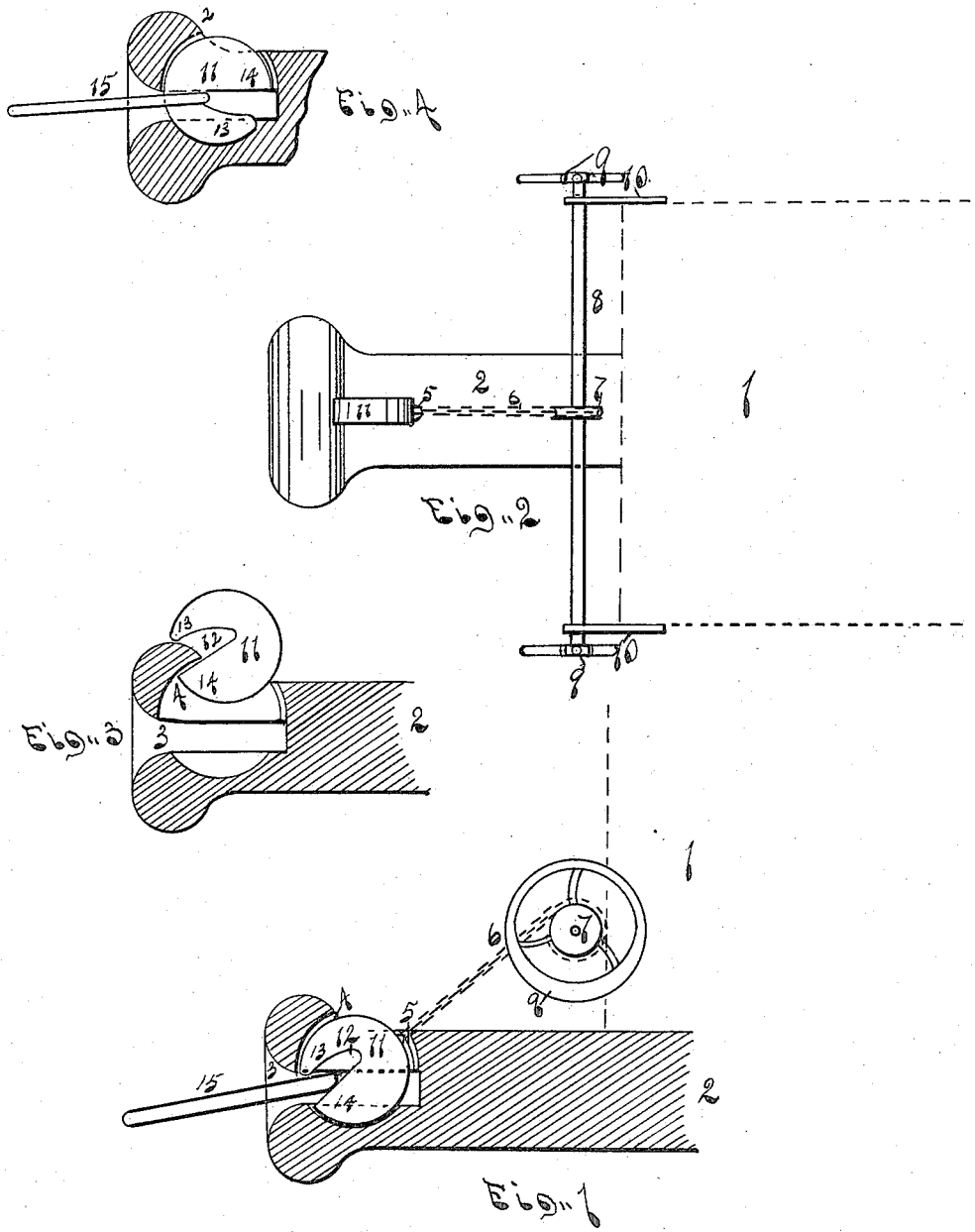
Witness
E. M. Mason
Cyrus E. Lothrop
Inventor
Nelson E. Springsteen
by Geo. H. Lothrop
atty.

UNITED STATES PATENT OFFICE.

NELSON E. SPRINGSTEEN, OF ROYAL OAK, MICHIGAN.

CAR-COUPLING.

SPECIFICATION forming part of Letters Patent No. 363,262, dated May 17, 1887.

Application filed February 10, 1887. Serial No. 227,142. (No model.)

*To all whom it may concern:*

Be it known that I, NELSON E. SPRINGSTEEN, of Royal Oak, in the county of Oakland and State of Michigan, have invented a new and useful Improvement in Car-Couplings, of which the following is a specification.

My invention consists in an improvement in car-couplings, hereinafter fully described.

Figure 1 is a vertical section. Fig. 2 is a plan view. Figs. 3 and 4 are vertical sections.

1 indicates a car-body, and 2 represents a draw-bar made of cast-iron or other suitable material, 3 representing the throat for the entrance of the link.

4 represents a vertical slot in the draw-bar, nearly circular in form, and preferably coming to the upper surface of the draw-bar to permit insertion or removal of the coupling-hook.

11 represents a coupling-hook, which I make in the shape of a flat disk, which would be practically circular but for the opening 12 cut therein, forming on one side of the opening a hook, 13. The rear side of this opening is nearly straight and extends as far as or beyond the center of the disk, while the front side of the opening is curved to form a hook, 13, so that when a link engages with the hook and strain is put upon the link the effect will be to prevent the disk from rotating and thereby uncoupling, which result could not be attained were the cuts in the disk both radial, or nearly so.

Disk 11 lies in slot 4 and moves freely therein, and can be inserted in said slot or removed therefrom by inserting hook 13 in the opening at the top of the draw-bar and rotating disk 11 to the left, Fig. 3, or by first inserting the point marked 14 into said slot and rotating the disk to the right, Fig. 3.

15 represents the ordinary link used for coupling cars.

8 represents a shaft extending across the front of the car, journaled in stirrups 10 and carrying at one or both ends a wheel or lever, 13, weighted at one side or one end, as shown at 9. 6 represents a chain fastened either directly to said shaft 8 or to a small wheel, 7, on said shaft and running therefrom to the disk 11, to which the chain is also secured.

5 represents a groove, which I prefer to cut at the back of slot 4 to permit chain 6 to enter said slot a short distance when it is desired to rotate disk 11 by hand, for the purpose of removal or insertion.

The operation of my invention is as follows: When disk 11 is lying in the position shown in Fig. 1, in which the point of the hook is as high as the upper surface of the throat 3, and chain 6 is slack, the coupling is in position to couple. When the end of link 15 enters the throat 3 of the draw-bar, its end strikes the part 14 of the disk 11 and rotates said disk, so that the hook 13 drops through the link and across the throat 3 and completes the coupling, as shown in Fig. 4. Strain on the link has no tendency to rotate the disk 11 and cause it to uncouple, and the rattling of the link in the draw-bar, instead of tending to raise the hook 13, tends to raise the part 14 of the disk and hold hook 13 in engagement with the link. To uncouple, shaft 8 is rotated by means of wheel or lever 13, thereby winding up chain 6 and rotating disk 11 until the opening 12 comes opposite the throat of the draw-bar, when the link can be removed.

The object of the weight 9 is to hold the shaft 8 stationary, and when the chain 6 is wound up and the weight 9 is left at the lowest point of the revolution of the lever or wheel said weight will hold the disk in the position shown in Fig. 1, where it is inoperative, and, conversely, by slacking chain 6 and leaving weight 9 in the position shown in Fig. 1, said weight will leave the disk free to move in coupling.

What I claim as my invention, and desire to secure by Letters Patent, is—

1. In combination with a draw-bar having a vertical nearly-circular slot therein, a flat metal disk having a portion thereof cut away, leaving an opening the rear side of which is substantially straight and the front side curved to form a hook lying loosely in said slot, substantially as and for the purposes set forth.

2. In combination with a draw-bar having a slot therein at right angles to and intersecting the throat, a rotatable metal disk having a portion thereof cut away, leaving an opening the rear side of which is substantially straight and the front side curved to form a hook lying loosely in said slot, substantially as shown and described.

3. In combination with a draw-bar having a vertical slot intersecting its throat and a rotatable metal disk partly cut away to form a hook lying therein, a shaft secured to the car, having at its end a counterweighted wheel or lever, and a chain connecting the periphery of said disk with said shaft, substantially as shown and described.

4. In combination with a draw-bar having a nearly-circular slot intersecting its throat, a coupling-hook of substantially the shape of said slot and rotatable in its periphery within said slot, and having a portion cut away, leaving an opening the rear side of which is substantially straight and the front side curved to form a hook, substantially as described.

NELSON E. SPRINGSTEEN.

Witnesses:
CYRUS E. LOTHROP,
SUMNER COLLINS.